Figure 6:
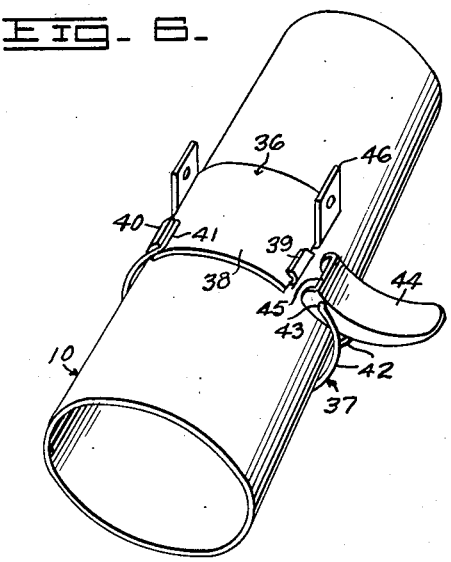

July 21, 1964 — M. MAYRATH — 3,141,642
SNAP-OVER CLAMP FOR CONVEYOR TUBES
Filed April 24, 1961 — 2 Sheets-Sheet 1
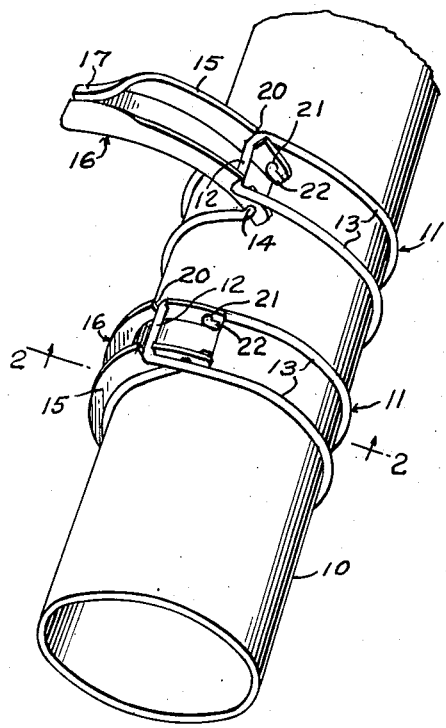
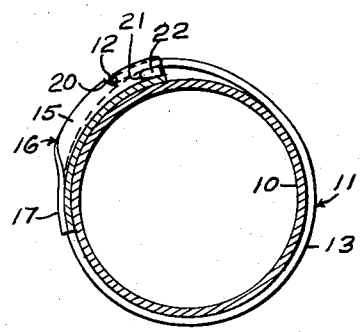
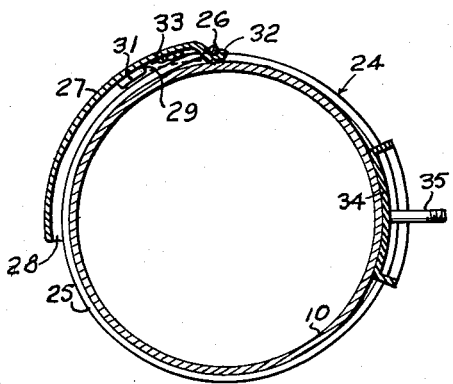
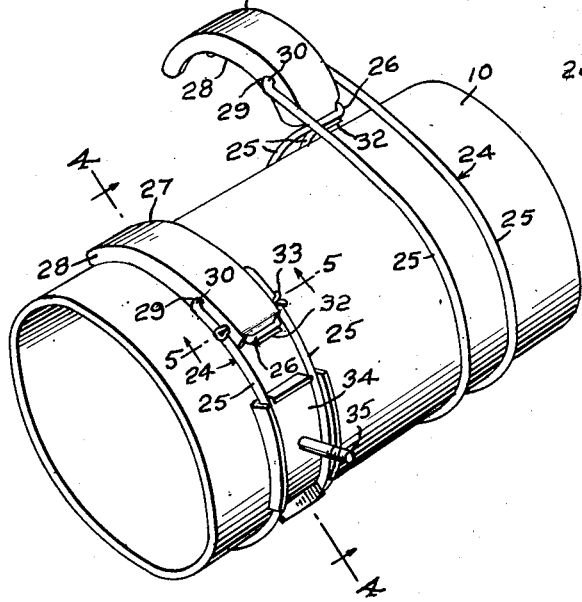
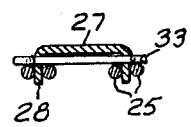
INVENTOR.
MARTIN MAYRATH
BY
ATTORNEY July 21, 1964

M. MAYRATH 3,141,642

SNAP-OVER CLAMP FOR CONVEYOR TUBES

Filed April 24, 1961

2 Sheets-Sheet 2

INVENTOR.
MARTIN MAYRATH
BY Homer C. Montague
ATTORNEY

United States Patent Office 3,141,642
Patented July 21, 1964

3,141,642
SNAP-OVER CLAMP FOR CONVEYOR TUBES
Martin Mayrath, 10707 Lennox Lane, Dallas, Tex.
Filed Apr. 24, 1961, Ser. No. 104,922
2 Claims. (Cl. 248—74)

This invention relates to a snap-over clamp and has particular reference to a device of this kind for fastening various fittings to the tubes of auger conveyors.

Conveyors of the type referred to are usually portable and supported on a wheeled carriage which includes radius rods projecting from the axle of the carriage toward one end of the auger tube and pivotally connected thereto. The carriage further includes supporting arms connected to the axle of the carriage and projecting in the other direction to engage and support the adjacent end of the auger tube in such a way as to be longitudinally movable therealong. In combination with such an arrangement of parts there is provided means for moving the free ends of the radius rods and supporting arms toward each other to vary the angle therebetween, thus moving the free ends of the supporting arms along the auger tube to change the angle of the latter to the horizontal and to adjust the height of the discharge end of the conveyor. It is the common practice in such mechanisms to provide means of various types for fixing with respect to the auger tube different devices employed in connection with the conveyor, such as motors for operating the conveyor, trunnions for pivotally connecting the free ends of the radius rods to the auger tube, etc.

An important object of the present invention is to provide a novel type of snap-over clamp adapted to surround and be clamped to a conveyor auger tube for supporting with respect to the latter any of the various devices normally fixed thereto.

A further object is to provide such a clamp which may be readily placed in position and snapped into clamping engagement with the tube and to remain rigidly in fixed position until it is desired for some reason to move it longitudinally of the auger tube or to remove it therefrom.

A further object is to provide a device of this character having a structure surrounding the auger tube and formed at least in part of fairly stiff wire which is advantageous over steel straps for several reasons, namely, the wire is easier to wrap around the tube, the wire fits the contour of the tube more accurately than a strap, and the wire grips the tube more securely than a strap so that it will not slip or turn on the tube.

A further object is to provide a simplified encircling structure of the type referred to wherein the wire is bent intermediate its ends to form a loop engageable with one portion of the clamp and has the free ends thereof turned to engage another portion of the clamp, thus providing a highly simplified as well as efficient clamp structure.

A further object is to provide novel simple means for positively preventing movement from the clamping position of the handle employed for effecting the clamping operation.

Other objects and advantages of the invention will become apparent during the course of the following description.

In the drawings I have shown several embodiments of the invention.

Figure 9:
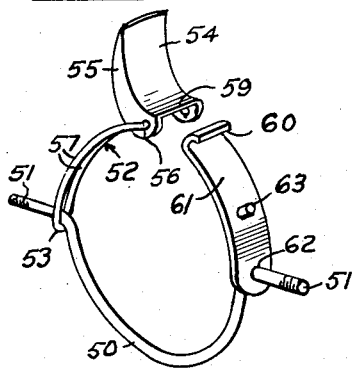
Figure 7:
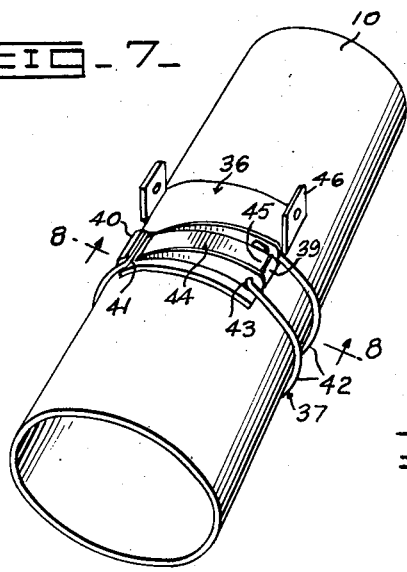
Figure 10:
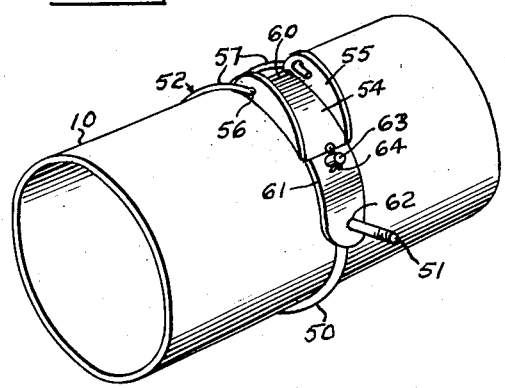
Figure 11:
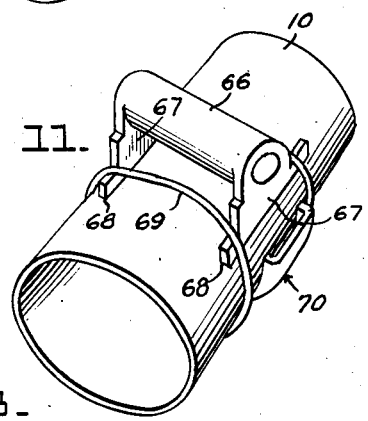
Figure 8:
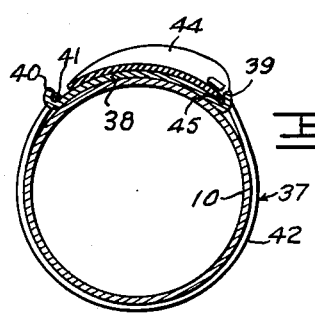

In this showing:
FIGURE 1 is a perspective view of a section of a conveyor auger tube showing two clamping devices of the same type thereon, one such device being unlocked and the other in clamping position;
FIGURE 2 is a transverse section on line 2—2 of FIGURE 1;
FIGURE 3 is a perspective view similar to FIGURE 1 showing a modified form of clamping structure;
FIGURE 4 is a transverse section on line 4—4 of FIGURE 3;
FIGURE 5 is a detail section on line 5—5 of FIGURE 3;
FIGURE 6 is a perspective view of a section of an auger tube showing another type of clamp in unlocked position thereon;
FIGURE 7 is a similar view showing the clamp in locked position;
FIGURE 8 is a transverse section on line 8—8 of FIGURE 7;
FIGURE 9 is a perspective view of a further form of clamp per se showing the parts unlocked;
FIGURE 10 is a similar view showing the clamp of FIGURE 9 in locked position about a tube; and
FIGURE 11 is a perspective view showing how one type of device may be clamped to the tube.

Referring to FIGURES 1 and 2, the numeral 10 designates an auger tube of the usual type in which is axially rotatable the usual conveyor auger (not shown). One type of snap-over clamp is illustrated and comprises a body 11 shown in the present instance as a stiff wire element adapted to entirely encircle the tube 10. This element is formed of a single piece of wire bent intermediate its ends to form a cross member 12 and substantially arcuate arms 13, the free ends of which provide pivot ends 14. These ends extend through the flanges 15 of a channel-shaped clamping handle 16. In this case, the flanges 15 face outwardly when the parts of the clamp are closed as in FIGURE 2, and one end of the clamping handle 16 has the flanges 15 thereof flattened out as at 17 to facilitate the application of hand pressure to lock the device in position as will become apparent.

The flanges 15 are provided with transversely aligned notches 20 in which the cross member 12 of the wire body 11 extends as shown in FIGURE 1. The pivot ends 14 of the wire extend through openings 21 in the flanges 15 and have their extremities within such flanges bent substantially parallel thereto as at 22 to insure against the slipping of the pivot ends 14 out of the openings 21. While not shown in FIGURES 1 and 2, it will be apparent that the clamp illustrated therein is adapted to hold in position against the auger device 10 any device or appliance normally utilized in connection with the conveyor.

In FIGURES 3, 4 and 5 a modified form of device is employed in which a wire body 24 is again employed comprising parallel arms 25 having a cross member 26 connecting them, similar to the cross member 12 of FIGURE 1 except somewhat shorter for a reason which will become apparent. A handle 27 is employed with the clamp in FIGURES 3, 4 and 5 and is curved from end to end, as is true of the handle 16 of FIGURE 1, to substantially fit the curvature of the tube 10, except that the handle 27, while of channel section, has inturned flanges 28. These flanges are apertured as at 29 to receive inturned pivot portions 30 of the ends of the wire 24, the extremities of the pivot portions 30 again being turned longitudinally of the flanges 28 as at 31 to prevent the pivot portions of the wires from slipping from the openings 29. The handle 27 at the end remote from the free end thereof has a narrowed arcuate finger 32 in engagement with the cross portion 26 of the wire 24. In forms of the invention described, movement of the handles to closed position causes the pivot portions 14 or 30 of the wires to snap past or over the center of the cross member 12 or 26, so that the tensioning of the clamp retains the parts in closed position. Novel very simple means is employed in FIGURES 3 and 4 to positively prevent the unlocking of the parts as could happen, for example, by the accidental striking of the free end of the handle 27. To this end a cotter pin 33 extends across and through the flanges 28 of the handle to overlie the portions of the arms 25 at both ends thereof as shown in FIGURE 5. Thus the handle 27 cannot be raised except by removing the cotter pin 33. The wire arms 25 may be used to secure in position a fitting 34 in the form of a curved plate fitting the tube 10 and flanged at its sides and ends to reinforce the plate, and the plate may be provided with a radially extending lug 35 for attachment to the plate 34 of any desired type of fitting.

A further modification of the device is shown in FIGURES 6 and 7, wherein the auger tube 10 is encircled partly by a fitting indicated as a whole by the numeral 36 and partly by a wire 37 similar to that previously described. In this case the fitting 36 is provided with a base 38 curved transversely to fit the curvature of the tube 10 and adjacent one transverse edge thereof, the base 38 is provided with lips 39 and 40. The latter lip engages the cross member 41 of the wire member 37. As before, this wire is bent intermediate its ends to form the cross member 41 and parallel spaced arms 42, the free ends of which turn inwardly as at 43 to form pivot portions connecting the wire arms to a handle 44 also arcuately formed to fit the curvature of the base 38 when the clamp is in closed position. One end 45 of the handle 44 is engageable behind the lip 39 whereupon the swinging over the tube of the handle 44 clamps the device in position. The fitting 36 may be of any desired type according to the device to be supported thereby and may be provided, for example, with upstanding apertured ears 46. The parts of this clamp are shown open and released in FIGURE 6 and closed and clamped in FIGURE 7.

In FIGURES 9 and 10 another form of the device is shown which is particularly adapted for clamping in position trunnions used for pivotally connecting to the tube 10 the radius rods of the conveyor carriage. In this case the clamp comprises a lower body portion 50 in the form of a rod bent semicircularly to fit the tube 10 and provided at its ends with outstanding radial trunnions 51, preferably threaded as shown to receive nuts for fixing in position with respect thereto the free ends of the radius rods. In this case a shorter wire body 52 is employed but this wire is of sufficient length to effectively engage the tube 10 with the advantageous results referred to above. The wire body 52 is bent intermediate its ends as at 53 to loop around one of the trunnions 51. A handle 54, arcuate transversely of the tube 10, is provided with flanges 55 through which extend the ends 56 of the two ends 57 of the wire 52. One end of the handle 54 provides a straight end 59 engageable back of a lip 60 formed on an arcuate plate 61 apertured as at 62 to fit over the other trunnion 51. An apertured stud 63 is fixed to the plate 61 and is arranged adjacent the end of the handle 54 when the latter is in clamped closed position as shown in FIGURE 10. In such position of the parts, a cotter pin 64 insertable through the opening in the stud 63 and overlies the adjacent extremity of the handle 54 to prevent opening movement thereof.

In FIGURE 11, there is shown a different suitable type of fitting for any desired purpose which may be fixed in position by one of the clamping devices described. Such fitting may be provided with a tubular bearing 66 extending transversely of the tube 10 and provided at its ends with depending flanges 67 adapted to seat on the tube 10. Each flange 67 is provided at its ends with fingers 68 around which may pass the wires 69 of any of the previously described clamping devices indicated as a whole in FIGURE 11 by the numeral 70. The bearing 66 may be used for the shaft of a windlass employed for moving the radius rods and supporting arms toward each other or for any other desired purpose.

*Operation*

The operation of each of the devices will be largely apparent from the foregoing description. It will be apparent that with the cross member 12 (FIGURE 1) disconnected from the notches 20, the wire 11 may be flexed to be placed around the tube 10 and any desired fitting may be clamped in position by the wire 11, for example either of the fittings 34 in FIGURE 4 or 66 in FIGURE 11. The cross member 12 is engaged in the notches 20 whereupon the fitting is moved as may be desired to place it in the proper position. With the parts of the clamp in the position shown at the top of FIGURE 1, the operator will exert a downward force on the handle end 17, whereupon the cross member 12 snaps across the plane of the pivot portions 14 of the wire 11. The tension placed on the parts maintains the clamp in closed operative position.

Substantially the same operation takes place with the form of the device shown in FIGURES 3, 4 and 5, except that instead of the cross member 26 engaging the slots in the flanges of the handle, it engages behind the lip 32 after the wire has been wrapped around the tube with the fitting in position thereunder. Force is exerted against the free end of the handle 27 and the parts will be locked in operative clamped positions. As a safety measure, to insure against the accidental unlocking of the parts, the cotter pin 33 is pushed through openings in the flanges 28 and the free ends thereof spread in the usual manner. The cotter pin will overlie the wire arms 25 fairly spaced from the pivot portions 29 thereof, thus effectively preventing the free end of the handle 27 from being moved outwardly.

In the preceding forms of the invention described, the wire body forms the entire encircling structure extending around the tube 10 or other element to which the clamp is to be applied. In FIGURES 6 and 7, the wire body 37 extends around approximately seventy-five percent of the circumference of the tube and the remainder of the encircling structure comprises the arcuate plate 38 of the fitting 36. The wire cross member 41, with the fitting 36 on top of the tube 10, is engaged behind the lip 40 and with the fitting 36 properly positioned, the end 45 of the handle 44 is engaged behind the lip 39, whereupon the handle 44 is swung over the top of the fitting 36 to assume the closed position shown in FIGURES 7 and 8. The body of the handle 44 preferably snugly fits the body 38 of the fitting 36 as shown in FIGURE 8.

In the form of the device shown in FIGURES 9 and 10, the wire body 52 encircles only about twenty-five percent of the circumference of the tube 10, but the rod body 50, passing around about 180° of the tube 10, functions in a manner similar to the wire body as to its effective gripping force on the tube 10. This form of the device is particularly adapted to provide properly clamped trunnions for connecting the radius rods of the conveyor carriage to the lower or inlet end of the tube 10. In this case all of the parts are assembled as shown in FIGURE 9, as distinguished from the placing in position of the cross members of the wire body in the other forms of the invention. The handle 54 and wires 57 are swung upwardly and outwardly and the same is true of the plate 61, thus opening the top of the device to be placed in position around the tube 10 from the bottom thereof. The parts are then swung back to the proximity of each other as shown in FIGURE 9, whereupon the handle end 59 is engaged behind the lip 60 and the handle 54 is swung downwardly to the clamped position shown in FIGURE 10. The cotter pin 64 is then inserted in position through the lug 63 and overlies the free end of the handle 54 to prevent accidental opening movement thereof.

The clamp 70 in FIGURE 11 may be of any of the applicable types described above, with the wires 69 separated apart the proper disttance to overlie the flange ends 68 and the closing and locking of the clamp will effectively hold in position whatever type of fitting 66 is employed.

Each of the clamps described above is simple in construction and economical to manufacture and is easily applied to fix to a conveyor auger tube any desired fitting, depending upon the use thereof. In each case the encircling structure of the clamp is entirely or largely made up of wire elements or the equivalent thereof, such as the rod body 50 in FIGURE 9. The use of such relatively narrow elements of circular cross section such as the wires or the rod 50 is highly advantageous over steel strap clamps. In the first place, the wire is easier to snap around the tube when installing the clamp, and the wire fits the contour of the tube more accurately than is true of relatively stiff wide strap. Moreover, when clamped, the wire or its equivalent rod 50 grips the tube more securely than a strap because of the limited areas of concentration of clamping pressure against the tube as compared with a strap. Therefore, the devices of the present construction will not slip or turn on the tube and they serve very effectively to clamp to the tube any of the devices commonly employed in connection with the construction and operation of an auger conveyor. The fittings may be located where desired, easily and quickly. If either one of the devices is a motor mount, such mount can be moved very easily by loosening and sliding the clamp to take care of belt stretch or to be placed so that different lengths of belts can be used for driving the auger.

It is to be understood that the forms of the invention shown and described are to be taken as preferred examples of the same and that various changes in the shape, size, and arrangement of the parts may be made as do not depart from the spirit of the invention or the scope of the appended claims.

What is claimed is:

1. A snap-over clamp and trunnion device comprising a split encircling structure adapted to surround a substantially cylindrically shaped body and to provide it with diametrally-aligned outwardly-extending trunnions, said device comprising an integral substantially semicircular rod shaped to fit around a portion of said body and provided at its ends with radially outwardly-extending trunnion portions in diametral alignment with one another, said device further comprising an arcuate plate curved to conform to the shape of said body, said plate having an aperture at one end through which passes one of said trunnion portions, to extend outwardly beyond said plate; the other end of said plate having an outwardly and backwardly turned lip; said device further comprising a wire having ends and a loop intermediate its ends extending around the root of the other trunnion portion; and an arcuate handle pivotally connected between the ends of said wire and having an extremity spaced from the pivot axis and engageable with said lip as said handle is rotated to overlie said plate; whereby, when the extremity of said handle is engaged with said lip and the handle is swung downwardly to overlie said plate, said device will be subjected to a circumferential pull to clamp said rod, said plate and said wire firmly to said body, with said trunnion portions secured thereto and extending outwardly therefrom along a common diametral axis.

2. A snap-over clamp and trunnion device in accordance with claim 1, including an apertured stud carried by and projecting outwardly from said plate in immediate proximity to the other extremity of said handle when the latter is in closed position overlying said plate, and a fastener extending through the stud aperture and overlying said other extremity of said handle to lock it in that position.

References Cited in the file of this patent
UNITED STATES PATENTS

| | | |
|---|---|---|
| 814,608 | Johnson | Mar. 6, 1906 |
| 991,192 | Battenfeld | May 2, 1911 |
| 1,017,265 | McRae et al. | Feb. 13, 1912 |
| 1,145,292 | Buck | July 6, 1915 |
| 1,483,050 | Wells | Feb. 5, 1924 |
| 1,819,768 | Coffing | Aug. 18, 1931 |
| 2,271,827 | Nichols et al. | Feb. 3, 1942 |
| 2,775,806 | Love | Jan. 1, 1957 |
| 2,915,799 | Andreasen | Dec. 8, 1959 |